United States Patent [19]

Moody

[11] Patent Number: 5,048,568

[45] Date of Patent: Sep. 17, 1991

[54] QUICK OPENING SLIDE VALVE

[75] Inventor: Paul E. Moody, Barrington, R.I.

[73] Assignee: The United States of America as represented by the Secretary of the Navy, Washington, D.C.

[21] Appl. No.: 539,953

[22] Filed: Jun. 18, 1990

[51] Int. Cl.⁵ .................. F16K 31/524; F16K 5/04
[52] U.S. Cl. .................. 137/625.28; 137/625.31; 251/56
[58] Field of Search .............. 137/625.28, 625.31; 251/56

[56] References Cited

U.S. PATENT DOCUMENTS 414,136  10/1889  Blanchard ................. 137/625.32
4,577,661  3/1986  Melrose et al. ............ 137/625.32 X

FOREIGN PATENT DOCUMENTS 602350  7/1960  Canada ........................ 251/56

Primary Examiner—Arnold Rosenthal
Attorney, Agent, or Firm—Michael J. McGowan; Prithvi C. Lall

[57] ABSTRACT

A slide valve is described that has the capability to open rapidly at a resonably controlled speed. The valve has two concentric tubes with each tube having a plurality of slots. In the valve closed position the slots are misaligned both axially and circumferentially. In the valve open position the slots in the inner cylinder coincide with respective outer slot openings. On moving from the closed to open position the inner tube is connected to a bracket that rides in an outer tube cammed slot. The bracket and inner tube to which it is connected are driven first longitudinally in the axial direction and then rotated on its axis while being driven further in the axial direction.

5 Claims, 1 Drawing Sheet

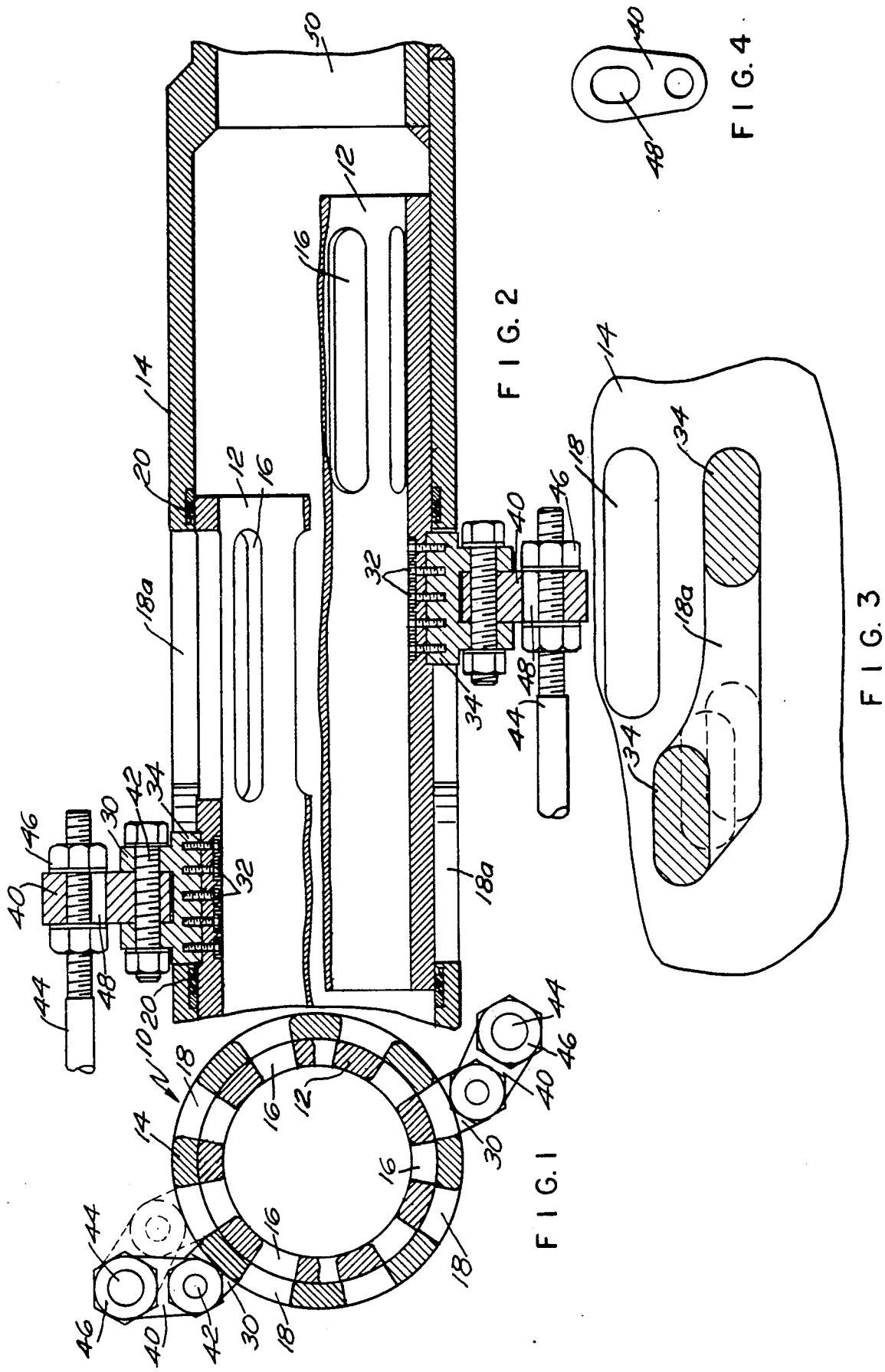

QUICK OPENING SLIDE VALVE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a valve. More particularly the invention relates to a valve that has the capability to open a flow path rapidly without the requirement for rapid actuation or excessive size. The valve is highly desirable for use in various types of launch systems.

(2) Description of the Prior Art

A number of launch systems are being considered which require the rapid opening of a pressurized flow path to eject a vehicle.

The only known way to achieve instantaneous opening of a flow path is to utilize a burst valve. However, a burst valve has an acoustic disadvantage. The member which bursts must be replaced every time it is used, and burst valves are not normally designed for large flow paths due to the complexity of holding back a large force prior to actuation. In addition, the portion of the valve which bursts must withstand varying pressures when the ejection barrel is open to the interior of the ship and the sea side of the valve is subjected to varying submergence pressures.

Standard valves are designed such that their opening provides a very small flow path when they first start to open. Their flow paths increase to their full potential on a timed basis, dependent on their opening rate. While the primary feature desired is that of rapid opening, it is also advantageous to utilize a valve which minimizes flow losses and is not excessively large. Ball valves minimize flow losses when open; however, they become quite large when designed for large flow paths. Gate valves have higher flow losses and they also become quite large when designed for large capacity flows. Spool valves or slide valves are compact designs. However, they normally take longer to open than ball or gate valves.

Any valve can be opened faster simply by increasing the operating speed of its operator, or by developing a mechanical advantage between the valve's actuator and its operating surface. The disadvantage to faster operation lies in the increased complexity or size of the operator and noise associated with the faster motion of mechanical parts.

Present launch systems utilize a slide valve to seal the launch tube from the launch tube ejection system. The slide valve is a linear actuated cylinder within the launch tube which, when actuated, opens slots in the launch tube to a tank which is pressurized by the launcher's ejection system. Such valve is fully satisfactory when used with the existing system as the slide valve is opened prior to the initiation of the ejection system and tank pressurization. Therefore, there is no need to operate the valve rapidly. If the slide valve's operator was modified to open the valve rapidly, it would have the acoustic problems associated with rapid actuation and only a small area would first be opened. Therefore, the initial flow through the valve would have a high velocity and launch would be effected by a gradual build up of pressure behind the device that was being launched. If a rotational slide valve were developed it would require seals between each slot in the slide valve cylinder and barrel when the assembly is in the closed position. Such a sealing system is extremely complex. In addition, the seals are susceptible to damage when the valve is rotated to its actuated position.

SUMMARY OF THE INVENTION

Accordingly, it is a general purpose and object of the present invention to provide an improved rapid opening valve. It is a further object that the valve is not excessive in size, overly complex, nor goes to the extreme in having rapid actuation. An additional object is that although a rotational movement is used, the sealing problems that normally accompany such a device are obviated.

These objects are accomplished with the present invention by providing a solution to the problem of how to open a large flow area as soon as valve opening begins. In the present invention a slide valve assembly is actuated by both a linear and rotational movement of a slide valve cylinder. The slide valve cylinder and a barrel both have a plurality of slots that must be aligned for emitting a fluid. Prior to actuation the slots are not aligned either linearly or circumferentially. By not being aligned linearly standard seals can be placed circumferentially between the slide valve cylinder and the barrel. On actuation, the slide valve cylinder first moves in an axial direction and a quasi-seal is maintained between the slide valve cylinder and the barrel. Valve ports are then opened by aligning the slide valve cylinder slots with the barrel slots. This is achieved by having both a rotational and further axial direction movement of the slide valve cylinder with relation to the barrel.

BRIEF DESCRIPTION OF THE DRAWINGS

FIG. 1 is a composite view of the quick opening slide valve showing the slide valve both before and after opening in accordance with the present invention;

FIG. 2 is a sectional composite view of the quick opening slide valve showing the slide valve both before and after actuation in accordance with the present invention;

FIG. 3 is an expanded view of the barrel slot of FIGS. 1 and 2; and

FIG. 4 is an end view of the power cylinder link of FIG. 2.

DESCRIPTION OF THE PREFERRED EMBODIMENT

Referring now to FIGS. 1 and 2 there is shown in each figure both the opened and closed position of the quick opening slide valve assembly 10. FIG. 1 shows on the bottom half the slide valve assembly 10 in the closed position prior to rotational actuation. The top half of FIG. 1 shows the slide valve assembly 10 in the opened position. FIG. 2 shows at the bottom half the slide valve assembly 10 in the fully closed position. At the top half of FIG. 2 there is shown the opened position of the slide valve assembly 10. This corresponds to the upper half of FIG. 1 after the valve has completed its full stroke.

Referring now to all the figures there is shown that the quick opening slide valve assembly 10 comprises a slide valve cylinder 12 that is subject to movement both circumferentially and axially with respect to a barrel 14.

The slide valve cylinder 12 has eight identical cylinder slots 16 and the barrel has six barrel slots 18 and two barrel slot 18a. The barrel slot 18a shown in FIG. 3 has a cam surface. While the total number of barrel slots 18 and 18a, in the present embodiment, is eight, there can be numbers other than the six and two selected. In addition, in other embodiments there can be any total number of slots as long as the total number of slots in the barrel 14 equals the total number of slots in the slide valve cylinder 12. For instance, there could be seven barrel slots 18 and one cammed barrel slot 18a.

An effective seal of the fluid within the slide valve assembly 10 is maintained when it is in the closed position by seals 20 that are located at both ends of barrel slots 18 and 18a between the barrel 14 and the slide valve cylinder 12.

When the slide valve assembly 10 is in the closed or a transient position, anywhere between fully closed and starting to open, the slide valve cylinder slots 16 are disoriented circumferentially from the barrel slots 18 and 18a by $22\frac{1}{2}°$ as shown on the lower view of FIG. 1.

The slots 16 and 18 are each slightly smaller around their respective circumferences than the $22\frac{1}{2}°$ separating them. This enables a metal to metal seal to be maintained between the slide valve cylinder 12 and barrel 14 when the slide valve cylinder 12 is moved only axially with respect to the barrel 14. Cammed barrel slot 18a is also of a configuration for this same metal to metal seal to be maintained during axial movement of the slide valve cylinder 12. Even if this metal-to-metal seal leaks, the amount of water which will leak will be minimal for the time associated with that portion of the valves actuation stroke.

The expanded view of the barrel slots 18 and 18a in FIG. 3 shows that the barrel slot 18a permits nine inches of axial length travel and is cammed for the last two inches of travel. In addition, the barrel slot 18a is the same in Width as barrel slots 18 for the first seven inches of travel. Therefore, the above mentioned metal to metal seal exists for seven inches of a nine inch stroke (78%). In the final two inches of stroke in the axial direction, the slide valve bracket is cammed in a circumferential direction for $22\frac{1}{2}°$. This effectively opens all eight slots 16 in the slide Valve cylinder 12 to the eight slots 18 and 18a in the barrel 14 simultaneously.

The quick opening slide valve assembly 10 shown in the figures further comprises a slide valve bracket 30 recessed into the slide valve cylinder 12. The bracket 30 is held in place by five screws 32. The five screws 32 attach the bracket 30 to the slide valve cylinder 12 and each screw 32 is sealed so that water cannot leak across the slide valve cylinder 12 by a path defined by clearance around the bracket base 34 and through the clearance between the attachment screws 32 and the slide valve cylinder 12. The bracket base 34 is recessed into the slide valve cylinder 12 so that any thrust resulting from the camming action is transmitted directly to the slide valve cylinder 12 and not through the attachment screws 32.

The bracket 30 is also connected to a power cylinder link 40 by means of nut, bolt and washer arrangement 42. Power cylinder rod 44 has nuts 46 connecting it to power cylinder link 40. The power cylinder rod 44 drives the slide valve cylinder 12 through the above connecting components.

The power cylinder rod 44 is a fixed distance from the barrel's 14 centerline. In addition the bracket 30 is a fixed distance from the barrel's centerline. However, as the bracket 30 is cammed from one position to another, the actual distance between the bracket 30 nut, bolt and washer arrangement 42 and the power cylinder rod's 44 centerline connection to power cylinder link 40 is reduced. To compensate for this reduction in distance, the aperture 48 in the power cylinder link 40 is slotted as shown in FIG. 4.

In operation, when opening valve assembly 10, the power cylinder rod 44 drives slide valve cylinder 12, from right to left along the path of barrel slot 18. The first 7/9 of the travel is in the axial direction and the valve remains closed. The complete valve opening is achieved in the final 2/9 of the systems normal actuation time when the slide valve bracket rides through the cammed portion of the barrel slot 18a. This is done with no increase in actuation speed. The rotational actuation of the slide valve cylinder 12 uncovers eight ports simultaneously by aligning slots 16 with respective slots 18 and 18a. As these ports were sized to provide twice the cross sectional flow area of the basic six inch diameter launch tube, there is a comparable fluid velocity through the slide valve assembly 10 ports to the velocity of the weapon being ejected with only one inch of travel once the slots 16, 18 and 18a were positioned so that they started to open a flow path (i.e.: seven to eight inches of stroke). The final inch of travel of the slide valve cylinder will result in even a greater port area and the velocity in the slots 16, 18 and 18a will approximate half of the vehicles velocity.

A primary advantage of this invention is that it provides a multiplier effect in relation to the time it takes to fully actuate a valve with respect to the time it takes to go from zero to a full flow area. Another advantage is that there is provided a flow area through the slots 16, 18, and 18a which is twice the cross sectional area of the launch tube without the necessity of utilizing a large valve. The reduced velocity of the flow through the slots 16, 18, and 18a, combined with a well radiused entrance and exit for the flow, minimize the pressure drop through the valve 10, valve induced turbulence, and its related structureborne vibrations.

There has therefore been described an improved slide valve assembly 10. The above dimensions were selected for a six inch diameter launch tube. It's basic concept can be utilized for any size flow path desired. However, the length of stroke would have to be modified if it were desired to provide the two-to-one ratio of flow through the slots 16, 18 and 18a to flow through the launch tube 50. The lengthy travel required by using the concept presented by this invention could be shortened by conducting a trade-off between these basic dimensions and the complexities introduced by increasing the diameter of the slide valve cylinder 12, or by reducing the 2:1 ratio between slot area and launch tube size.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A quick opening slide valve assembly comprising:
   a cylindrical tube having a plurality of tube slots;
   a barrel concentric with said cylindrical tube and located radially outward of said cylindrical tube, said barrel having a plurality of barrel slots misaligned in both the axial direction and around the circumference with said plurality of tube slots when said slide valve is closed;

sealing means for providing a seal between said tube slots and said barrel slots, and the inside of said cylindrical tube and said barrel slots when said slide valve is closed; and linkage means connected to said first cylindrical tube for transferring and modifying a driving force so as to drive said first cylindrical tube both axially with respect to said barrel and around the circumference of said barrel so that said sealing means no longer forms a seal between said first slots and said second slots and said first slots coincide with openings in said second slots to form a plurality of ports between the inside of said cylindrical tube and the outside of said barrel.

2. A quick opening slide valve according to claim 1 wherein said sealing means further comprises:

a first seal concentric with and located radially between said first and second tubes and longitudinally between said first and second slots; and a second seal concentric with and located radially between said first and second tubes and longitudinally between said second slots and an end of said first cylindrical tube.

3. A quick opening slide valve according to claim 2 wherein said linkage means further comprises:

a bracket connected to said first cylindrical tube through one of said second slots in said barrel; and a power cylinder link connected to said bracket; and a power cylinder rod connected to said power cylinder link.

4. A quick opening slide valve according to claim 1 wherein said barrel further comprises at least one of said barrel slots having a cam surface in which said bracket rides.

5. A quick opening slide valve according to claim 3 wherein said barrel further comprises at least one of said barrel slots having a cam surface in which said bracket rides.

* * * * *